United States Patent Office 3,823,203
Patented July 9, 1974

3,823,203
VULCANIZABLE SELECTIVELY HYDOGENATED BLOCK COPOLYMER COMPOSITIONS
Harold E. De La Mare, El Cerrito, Calif., assignor to Shell Oil Company, New York, N.Y.
No Drawing. Filed Mar. 29, 1971, Ser. No. 129,326
Int. Cl. C08f 15/00, 19/00
U.S. Cl. 260—876 B         9 Claims

ABSTRACT OF THE DISCLOSURE

Vulcanizable block copolymer compositions are provided comprising (1) a selectively hydrogenated block copolymer having, prior to hydrogenation, at least one mono alpha alkenyl arene polymer block and at least one conjugated diene polymer block, said block copolymer having been hydrogenated to saturate at least 80% of the aliphatic double bonds, and (2) an unsaturated block copolymer having at least one mono alpha alkenyl arene polymer block and at least one conjugated diene polymer block. The compositions may be vulcanized with accelerated sulfur system or with peroxide systems, and after vulcanization, are insoluble products that have excellent creep resistance and improved solvent resistance.

BACKGROUND OF THE INVENTION

This invention is concerned with vulcanizable block copolymer compositions and the vulcanized products made from them. More particularly, it is directed to selectively hydrogenated block copolymers whose vulcanizability has been improved by blending intimately therewith unsaturated block copolymers that react with sulfur, peroxide or other types of vulcanizing agents.

Block copolymers are acquiring increased importance today in the manufacture of a wide variety of useful products. One class that has been developed has the typical structure A—B—(—A)$_n$, where $n$ is an integer from 1 to 5, wherein the A blocks are mono alpha alkenyl arene polymer blocks and the B blocks are polymer blocks made from conjugated dienes. The art of preparing these polymers is well known; in one method, separate, adjacent polymer blocks are formed from conjugated dienes and mono alpha alkenyl arenes by anionic polymerization using organolithium initiators. A typical block copolymer of this class is exemplified by polystyrene-polybutadiene-polystyrene.

These block copolymers are not ordinarily vulcanized, because they have high strength resulting from what is usually called a domain structure; the block copolymers are often described as "self-curing." The domain theory postulates that the mono alpha alkenyl arene polymer blocks and the diene polymer blocks are structurally quite different and are therefore thermodynamically immiscible; as a result, the two types of blocks separate into two phases. The embedded mono alpha alkenyl arene polymer block phase provides the strength and the continuous diene polymer block matrix phase provides the elasticity.

The set of properties in the final block copolymer depends on a number of factors, among them the chemical identity of the polymer blocks, individual block molecular weights, ratio of molecular weights of the different species of blocks, total molecular weight and other variables. By careful selection among these factors, especially the relative block molecular weights, the whole set of products from highly elastic to highly plastic materials may be prepared. According to the prior art, a simple structure such as A—B—A, in which each A is a mono alpha alkenyl arene polymer block and B is a conjugated diene polymer block, will have elastomeric properties and also be thermoplastic, if the A polymer blocks constitute less than about 50% of the entire weight of the polymer molecule.

The finished articles made from these block copolymers have many excellent properties, but they are, generally, soluble in or highly swollen by most organic solvents, and they will slowly flow (creep) under load. Actually, the high strength of these block copolymers is believed to derive from the very high viscosity of the domains formed from mono alpha alkenyl arene polymer blocks, which retain the end polymer blocks and resist the slippage of one molecule past another. As the temperature increases, the viscosity of a block polymer decreases, its resistance to molecular slippage decreases, and it exhibits more rapid flow under load. This behavior and the solubility limit the utility of the block copolymers in many applications.

Molecular slippage can be restrained at all temperatures by vulcanization crosslinking, which inserts new chemical bonds between molecules and thus ties them together. Such crosslinking is the normal condition in commercial vulcanized rubber, where essentially one enormous molecule of homopolymer elastomer has been created by tying a large number of molecules together. The same kind of crosslinking has been tried on the unsaturated block copolymers using sulfur and accelerator as vulcanizing agents, but with rather mediocre results. The unsaturated diene polymer block was attacked in random manner by vulcanizing agents, but when enough crosslinks had been installed to achieve improvements in solvent resistance, the products had high modulus and relatively poor elasticity. Also, these vulcanized block copolymer products had large numbers of double bonds remaining after curing, and were subject to ready attack by oxygen and ozone.

OBJECTS OF THE INVENTION

It is an object of this invention to provide improved vulcanizable block copolymer compositions. It is a specific object of this invention to provide compositions comprising intimate blends of selectively hydrogenated block copolymers and unsaturated block copolymers that have, when vulcanized, improved solvent resistance, improved resistance to creep and other useful properties. Other objects will become apparent during the following detailed description of the invention.

DESCRIPTION OF THE PREFERRED EMBODIMENTS

Now, in accordance with the present invention, improved vulcanizable block copolymer compositions are provided comprising (1) about 50% to about 95% of a selectively hydrogenated block copolymer having, prior to hydrogenation, at least one mono alpha alkenyl arene polymer block and at least one conjugated diene polymer block, said block polymer being hydrogenated selectively to saturate at least 80% of the aliphatic double bonds, and (2) 5% to about 50% of an unsaturated block copolymer having at least one mono alpha alkenyl arene polymer block and at least one conjugated diene polymer block. The invention also encompasses vulcanized products made from the polymeric composition by reaction with chemical curing agents or by radiation.

The Number 1 linear or branched block copolymers constituting the first polymeric component of this invention have, prior to hydrogenation, the general configurations including A—B—A, A(—B—A)$_n$, A—B or A—B(—B—A)$_n$, wherein $n$ is an integer between 2 and about 5, and wherein each A is a monoalpha alkenyl arene polymer block and each B is a polymer block of a conjugated diene having 4 to 8 carbon atoms per molecule, preferably 4 to 6 carbon atoms per molecule. Where at any point two essentially identical B blocks are directly connected, except possibly for the residue of a coupling agent, the connected blocks are considered to be a single block for the purposes of describing molecular weights, responses to hydrogenation and the like. Branched chain structures are designated by the general formula A—B(B—A)$_n$, for example, where a tetrafunctional coupling agent is used, the structure would be represented by

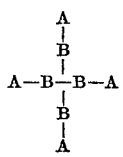

It will be understood that this general formula for the precursor block copolymer has been written to include either sequentially formed species or species that have been formed, at least in part, by the use of coupling agents. In the latter instance any residue of the coupling agents has been ignored as being an insignificant part of this general formula for high molecular weight polymers.

Typical mono alpha alkenyl arene A polymer blocks may be prepared from styrene, ring alkylated styrenes, alpha alkyl styrenes, vinyl naphthalenes and the like, or mixtures thereof. Styrene and alpha methyl styrene are preferred monomers. These monomers may contain minor proportions, based on the mono alpha alkenyl arene, of copolymerizable monomers that have conjugated double bonds, such as conjugated dienes, vinyl pyridines and the like.

Typical conjugated dienes that may be used to form B polymer blocks are butadiene, alkyl substituted butadienes such as isoprene or 2,3-dimethyl butadiene, 4-methyl butadiene (piperylene) and the like, or mixtures thereof. The B polymer blocks may be homopolymeric blocks of butadiene or isoprene or copolymers prepared from mixtures of dienes or dienes mixed with minor proportions of mono alpha alkenyl aromatic hydrocarbons. A preferred species of such a copolymer B block comprises a styrene-butadiene copolymer block.

The average molecular weight of each A polymer block in the precursor block copolymers useful in this invention may be from about 3,000 to about 45,000; preferably the average molecular weight range should be between about 5,000 and 30,000. The B polymer blocks may have average molecular weight from about 10,000 to about 135,000, preferably between about 20,000 and about 80,000. The proportion of A blocks may be from about 5% by weight to about 70% by weight of the total weight of the block copolymer, preferably from about 10% by weight to about 60% by weight. After the selective hydrogenation step discussed below, the properties of the block copolymers will range from highly elastomeric rubbers at low A polymer block percentages to slow recovering elastomers or even products with plastic character at high A polymer block content.

Vulcanizable unsaturated block copolymers suitable for blending with the selectively hydrogenated Number 1 block copolymers have the general formula

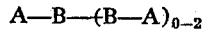

wherein each A is a mono alpha alkenyl arene polymer block and each B is a polymer block made from a conjugated diene. When the subscript in the general formula is 0, a two-block copolymer is indicated, and this is the preferred structure because it will impart not only vulcanizability but also some improvement in processability to the selectively hydrogenated block copolymer. When the subscript is 1 or 2, more complex block copolymers are designated that are desirable because they will confer vulcanizability, but may not have a positive effect on overall processability.

Typical mono alpha alkenyl arene A polymer blocks and typical conjugated diene B polymer blocks in the unsaturated block copolymers may be prepared from the monomers described above as typical for the corresponding A and B blocks of the precursor block polymers used to make the selectively hydrogenated block copolymers. It is desirable that the mono alpha alkenyl arene A polymer blocks of the selectively hydrogenated block copolymer and the mono alpha alkenyl arene A polymer blocks of the unsaturated block copolymer be made from the same monomer. Such matching of mono alpha alkenyl arene polymer blocks provides the best compatibility between the two kinds of polymers, and is believed to enhance the effect of the "phase anchoring" principle described hereinafter. However, at A block molecular weights below about 20,000, two (or more) arene species may be employed. In fact, service temperature may be enhanced by utilizing alpha methyl styrene polymer blocks if the second type is a polystyrene block as long as block molecular weights are less than about 20,000 in each type.

The average molecular weight of each A polymer block in the unsaturated Number two block copolymer may be from about 5,000 to about 40,000, preferably from about 8,000 to about 30,000. The B polymer blocks may have average molecular weights from about 3,000 to about 150,000, preferably between about 5,000 and about 50,000. The proportion of A blocks may be from about 5% by weight to about 70% by weight of the total weight, preferably from about 10% by weight to about 50% by weight.

Solution polymerization by techniques known to the art is preferred to make both the precursor block copolymers to be hydrogenated and the vulcanizable block copolymers for blending. Lithium based catalysts may be used that may be monofunctional, for example, lithium alkyls, or polyfunctional, for example dithiostilbene or the addition product of secondary butyl lithium and 1,3-divinyl benzene. The monomers are dissolved in inert solvents. Anaerobic conditions are essential, and reactive impurities must be removed from both the highly purified monomers and the solvents by scavenging the impurities with very carefully measured quantities of the polymerizing initiator. For example, a solution of purified styrene in dry cyclohexane is treated with small amounts of lithium alkyl to the point of incipient polymerization to remove impurities, after which a quantity of lithium alkyl, such as secondary butyl lithium, is added that is sufficient to cause polymerization to a polymer block of appropriate molecular weight. A second monomer, such as butadiene, and later a third monomer, if desired, may be added to form subsequent polymer blocks, being careful in each instance that the previous monomer is consumed by polymerization or any excess is removed.

In this way a two-block polymer A—B may be formed (or a three block polymer A—B—A if a dilithio initiator is employed) and use as is, or coupled or made into a three-block polymer with more monomer, all within the scope of this invention. The A—B—Li living two-block polymer may be coupled with a dihaloethane to form a linear A—B—B—A structure or it may be joined in a multiple way to form a star-shaped, radial, branched or nonlinear structure (depending on the nomenclature desired) using a polyfunctional coupling agent such as silicon tetrahalide, diesters of dicarboxylic acids and monohydric alcohols like diethyl adipate, and other coupling agents known to the art.

If highly elastomeric, selectively hydrogenated block copolymers are desired, control must be exercised during polymerization over the type of structure in the B block. For example, if a highly elastomeric block is desired when the B blocks before hydrogenation are polybutadiene, the production of 1,2 microstructure during polymerization must be held within 20% and 60%. Reference here is to the mode of insertion during polymerization of conjugated diene molecules into the B blocks. Insertion can occur in several ways, using lithium based catalysts, to produce cis 1,4, trans 1,4, and 1,2 or 3,4 microstructures. In this application and claims the term 1,2 microstructure includes both the 1,2 and 3,4 configurations. The presence of these configurations in polybutadiene blocks may be determined by infrared analysis to measure the relative absorbances at wave lengths of 10.05 and 10.98 microns (1,2 microstructure), 10.35 microns (trans 1,4 microstructure) and 13.60 microns (cis 1,4 microstructure). The percentage of 1,4 and 1,2 microstructure may also be measured by nuclear magnetic resonance spectrometry.

The 1,2 microstructure is easily controlled by means known to the prior art, as by including in the polymerization system, at least during the formation of the polybutadiene block, a nucleophilic polar substance such as an ether, tertiary amine or hexaalkylphosphoramide. Typical polar substances are tetrahydrofurane, anisole, triethylamine and tetramethylethylenediamine. Amounts required will depend on the amount of 1,2 microstructure desired. To achieve the range of about 20% to about 60% 1,2 microstructure required in the block copolymers to be hydrogenated for the present invention it is necessary to use between about 2 and about 50 moles of tetrahydrofurane, for example, per mole of lithium ion. Block copolymers with butadiene polymer block made in the absence of one of these polar substances will have too little 1,2 microstructure; polar blocks made with too much polar substance present will contain too high a proportion in the 1,2 configuration. In both cases the hydrogenated B block will have poor elastomeric quality. Such block polymers of low elasticity are useful in plastic articles and articles where good sound or vibration damping qualities are desired.

In contrast, a low 1,2 and 3,4 content is desirable for best elastomeric quality when isoprene or alkyl substituted butadienes are used as monomers to form the B block of the copolymers useful in this invention. When hydrogenated, the 1,2 and 3,4 microstructures in a polyisoprene block produce structures that have poor elastomeric characteristics, whereas the hydrogenated cis 1,4 and trans 1,4 structures have good elastomeric characteristics. Therefore, if good elastomeric quality is desired, production of 3,4-microstructure should be avoided while polymerizing the isoprene block, and polar, nucleophilic substances should not be present. Products of lower elastomeric quality may be produced, however, for sound and shock absorptive applications and for other purposes.

It is necessary, then, that the polymerization of each monomer or mixture of monomers chosen to compose the B block of the precursor of the Number 1 block copolymer be conducted under the conditions that will yield high elastomeric quality in the hydrogenated final product, or the opposite if the block copolymer is destined for end uses requiring plastic properties. The extent of desirable 1,2 addition can only be determined by experiment, especially when mixtures of monomers are used to form the B block.

The B blocks of the unsaturated Number 2 block copolymer to be blended with the selectively hyrogenated Number 1 block copolymer to impart good vulcanizability may not require such careful control of the microstructure. The high content of cis 1,4 microstructure ordinarily produced in the copolymer when polymerization is conducted in inert hydrocarbon solvent confers good elastomeric properties. However, 1,2 or 3,4 microstructure, that is, structures in which the olefinic double bonds are located in side chains and are therefore external of the main polymer chain, may vulcanize faster in the polymeric blends of this invention, and may therefore be preferred for some applications. When this property is desired, the 1,2 or 3,4 microstructure of the vulcanizable block copolymer may be increased during polymerization by the addition of the polar substances described hereinbefore.

The block copolymer produced by polymerization is selectively hydrogenated to form the Number 1 polymer under conditions chosen so that at least 80% of the double bonds in the conjugated diene polymer block will be saturated and the mono alpha alkenyl arene polymer blocks will not be hydrogenated to any substantial extent. Hydrogenation is preferably carried out by dissolving the precursor block copolymer in an inert solvent, usually the polymerization solvent, adding a cobalt, nickel or iron carboxylate or alkoxide that has been reduced with an aluminum alkyl compound, and pressuring with hydrogen to between 50 p.s.i.g. and 1200 p.s.i.g. at mild temperatures of 20 to 70° C. The selective hydrogenation proceeds to the extent desired in about 0.2 to 3 hours.

The product from hydrogenation may be examined for remaining olefinic unsaturation by infrared spectrometer analysis and by determination of iodine number. The infrared absorbances at wave lengths of 10.05, 10.35, 10.98 and 13.60 microns are indicative in polybutadiene blocks of the remaining olefinic unsaturation in the conjugated diene polymer blocks. It is prefererd that those absorbances be low. The iodine number of the block copolymer is reduced by hydrogenation from about 200–400 down to the order of 40 by selective hydrogenation. It is still more preferred that the iodine number be below about 15. The iodine number here refers to the usual fat analysis method, and the units are reported in grams of iodine per 100 grams of block copolymer. The double bonds in the aromatic rings of the mono alpha alkenyl arene polymer blocks of the block copolymer do not add iodine in this analytical method, so that only the the olefinic unsaturation in the diene polymer blocks is counted.

The hydrogenation may not be completely selective and some of the aromatic double bonds may be hydrogenated under the conditions noted above. Such an event may occur with particular catalysts or hydrogenation conditions, or with unusual samples of a catalyst that is normally very selective. Hydrogenation of up to about 25% of the aromatic double bonds in the block copolymer may occur, despite great care. For this reason, hydrogenated block copolymers wherein the diene polymer blocks are more than 80% saturated and mono alpha alkenyl polymer blocks that are saturated to an extent of 0% to about 25% are within the scope of this invention.

The compositions of this invention contain at least 50% by weight of the high strength, selectively hydrogenated Number 1 block copolymer and 5–50% of the Number 2 unsaturated block copolymer that provides vulcanization sites. While it is not to be construed in a limiting way on this invention, the following hypothesis has been proposed to describe the molecular distribution in vulcanized products of the invention: The unhydrogenated plastic mono alpha alkenyl arene polymer blocks of the two kinds of block copolymers are essentially compatible, and can enter the same domain. The elastomeric blocks of the two kinds of block copolymers are unlike and incompatible, since the olefinic double bonds in one type of polymer have been hydrogenated to a major extent and the double bonds in the other type of block copolymer have not been hydrogenated at all. The intimate mixture of the two types of block copolymers is believed to involve a "phase anchoring," in which mono alpha alkenyl arene polymer blocks from the two types of polymer are in the same phase, but the unsaturated diene polymer blocks are incompatible with and are believed to be scattered through the main matrix formed from the hydrogenated diene polymer. The unsaturated polymer blocks may also be in a separate, annular "shell" surrounding the domains containing the mono alpha alkenyl arene polymer blocks.

In this hypothesis vulcanization is believed to tie together the unsaturated diene polymer chains to make a three-dimensional network that surrounds the plastic domains, but each diene polymer block that participates in the vulcanization also is attached to a mono alpha alkenyl arene polymer block that is inside one of the domains. Any residual unsaturation in the B blocks of the Number 1 polymer may also participate in the vulcanization reaction, resulting in a still stronger network. Since the vulcanized network is outside the plastic domain, it adds improved creep resistance and improved resistance to solvents without affecting the peculiar properties contributed to the total polymer by the plastic domains. Presumably the vulcanized network substantially prevents access of solvent molecules to the plastic domains and thus improves solvent resistance by preventing their dissolution by the solvent.

The two kinds of block polymers may be mixed by any of a number of techniques, known to the art. Particularly useful procedures are to mix the two ingredients in a shear mixer, for example, a stationary Banbury machine, or on the run in a continuous mixer or shear extruder, or on a two-roll mill. In another technique, the two kinds of polymers may be dissolved in a mutual solvent, such as cyclohexane, then recovered by high speed coagulation or by adding a non-solvent. Alternatively, the solution may be used without coagulation for coatings.

Vulcanizing agents, such as sulfur with typical commercial primary and secondary accelerators typified by benzothiazyl disulfide or mercaptobenzothiazole or benzothiazyl-2-sulfenomorpholide, or peroxides exemplified by dicumyl peroxide; $\alpha,\alpha'$-bis(t-butylperoxy)diisopropyl benzene, and 2,5-bis(t-butylperoxy)-2,5-dimethyl hexane, or other vulcanizing agents, may be incorporated at the time that the two kinds of block copolymers are mixed. Alternatively, they may be added afterwards by any of the techniques common in the prior art. The sensitivity of the vulcanizing systems to heat, often known as the scorch time, will usually dictate the incorporation method to be used. It is often preferred to mix the two copolymers in a continuous mixer, adding the vulcanizing ingredients near the discharge end of the mixer to shorten the heat exposure of the vulcanizing ingredients; subsequent fabrication is thus less sensitive to heating time before vulcanization ensues and interferes with processing.

Radiation may also be employed to cure the compositions of this invention in the absence or presence of chemical curing agents or sensitizers. The polymeric compositions may be exposed, for example, to high energy electrons or to gamma radiation to cause cross-links and to develop the desirable properties of insolubility, improved solvent resistance and improved resistance to creep under load. Added chemicals may be present to assist such radiation crosslinking; examples of such chemicals are tetracyanoethylene, triisoproponyl benzene, and dichlorobenzene.

The blend of selectively hydrogenated block copolymers and unsaturated block copolymer may be compounded further with oils, fillers, antioxidants, stabilizers, antiblocking agents and other typical rubber and plastics compounding ingredients, as well as with the required vulcanizing agents, without departing from the scope of this invention. These additives are often present in commercial products to enhance environmental stability, to reduce costs and for other purposes.

Elastomeric compositions prepared in accordance with this invention are suitable for most purposes where rubbers are employed, such as in coatings, mechanical goods, latices, paints, thermoformed articles, insulations, etc. The compositions may be injected molded, blow molded, compression molded and extruded. Other molded articles as well as films, sheets, textile coatings and the like may be produced. The compositions may be cast from solvents to form films or spun into fibers or coated on other objects. Plastic molding compositions having the usual plastic end uses may be prepared, particularly when the mono alpha alkenyl arene polymer blocks constitute a high percentage of the weight of the selectively hydrogenated block polymer and the resulting product is essentially non-elastomeric. Contemplated plastic end uses are moldings, mechanical goods, extruded objects such as pipe, films, sheets, wire coatings, fibers and the like.

The following examples illustrate the manner in which the invention may be carried out. The examples are for the purposes of illustration, and the invention is not to be regarded as limited to any of the specific compounds or polymers or to the conditions recited. Unless otherwise stated, the term phr. stands for parts per hundred of polymer.

EXAMPLE I

A polystyrene - polybutadiene - polystyrene three-block copolymer having 46% 1,2 microstructure in the polybutadiene block was prepared and selectively hydrogenated as follows:

Polymerization

All monomers and solvents were treated to remove water, oxygen and polar materials, and the reaction system was thoroughly purged and blanketed with nitrogen. The reactor was charged with 4200 g. of cyclohexane and 468 g. of styrene that had been titrated to scavenge reactive impurities. Then 0.031 mole of secondary butyl lithium in 275 g. of cyclohexane was added to start polymerization, which converted essentially all of the styrene to polystyrene in one hour at 50° C. A 132 g. sample was withdrawn for analysis.

The rest of the living polymer solution was transferred to a second reactor containing 2160 g. of butadiene, 11,535 g. of cyclohexane and 50 g. of tetrahydrofurane (tetrahydrofurane/lithium ratio 20:1) that had been pretitrated with secondary butyl lithium to incipient polymerization. After three hours of further polymerization at 40° C., the butadiene was substantially all consumed to form the second block of copolymer. A second sample was removed for analysis.

A solution of 442 g. of styrene at 2650 g. of cyclohexane, pretitrated with secondary butyl lithium to incipient polymerization, was then charged to the reactor to form the third block of the copolymer. After one hour at 45° C. polymerization was complete. A third sample was removed for analysis, and the remainder of the polymer solution was hydrogenated.

Analysis of each of the three samples removed during polymerization by a tritium method indicated the average molecular weights of the three blocks to be 13,000–64,000–15,000. The polybutadiene middle block of this polymer contained 46% 1,2 microstructure, using an infrared analysis based on absorbances at the wave lengths described hereinabove.

Selective Hydrogenation

In a typical selective hydrogenation run the polymer solution from the polymerization step was transferred to a hydrogenation autoclave. As catalyst 6 millimoles of nickel acetyl acetonate was reacted with 12 millimoles of triethyl aluminum in 1500 ml. of cyclohexane for 15 minutes at 25° C., then added to the system. The autoclave was pressured to 500 p.s.i.g. with hydrogen. The reaction temperature rose to 50° C., and after 25 minutes hydrogenation was stopped. The selectively hydrogenated polymer had an iodine number in the range 10–20.

After recovery by coagulation and drying, and after molding to make typical rubber specimens, the pertinent physical properties of a typical selectively hydrogenated polymer were determined by ASTM rubber techniques.

Data were:

| | |
|---|---|
| Tensile strength at break, 23° C., p.s.i. | 7000 |
| 300% Modulus, 23° C., p.s.i. | 650 |
| Elongation at break, 23° C., percent | 590 |
| Set after break, 23° C., percent | 20 |

EXAMPLES II AND III

A selectively hydrogenated polystyrene-polyisoprene-polystyrene block copolymer (100 parts) made in the same way as the polymer described in Example I was mixed with an unsaturated polystyrene-polybutadiene two-block copolymer (35 parts). The two types of block copolymers had the following properties:

| | Unsaturated polystyrene-polybutadiene two-block copolymer | Selectively hydrogenated block copolymer (before hydrogenation) |
|---|---|---|
| Average molecular weights of: | | |
| 1st polystyrene block | 13,800 | 15,200 |
| Polybutadiene | 4,700 | |
| Polyisoprene | | 72,000 |
| 2nd polystyrene block | | 15,206 |
| 1,2 or 3,8 microstructure | ~9% (1,2) | ~7% (3,40 27) |
| Iodine number before hydrogenation | | (121) |
| Iodine number after hydrogenation [a] | | ~2 |

[a] Ultraviolet light spectroscopy showed that only ~0% of the aromatic double bonds had been hydrogenated.

The block copolymers were intimately mixed on a hot two-roll laboratory mill, then 2 phr. of sulphur and 2 phr. of benzothiazyl-2-sulfenomorpholide were incorporated before the compound was removed from the mill. As a control, a similar compound was made without the sulfur and accelerator, but with 5 phr. benzpinacol which was found to be an inert additive under these conditions. Both compounds were placed in rubber molds and heated in a press to form specimens suitable for ASTM rubber testing. The vulcanizable compound was cured for 30 minutes at 175° C. and the control compound was heated (no vulcanization) for 50 minutes at 150° C. Data from various tests are in Table I.

TABLE I.—TEST DATA—SULFUR CURED COMPOSITION
(Composition: 100 parts selectively hydrogenated block copolymer; 35 parts unsaturated block copolymer

| | No vulcanizing agent | Sulfur-accelerator vulcanization |
|---|---|---|
| Example | II | III |
| Tensile strength, 23° C., p.s.i. | 840 | 2,800 |
| 300% modulus, 23° C., p.s.i. | 670 | 1,600 |
| Elongation at break, 23° C., percent | 390 | 470 |
| Set, 23° C., percent | 40 | 120 |
| Solvent swell ratio: [a] | | |
| Toluene | Soluble | 7.2 |
| Isooctane | 14.5 | 9.6 |
| Creep, percent, 70° C.[b] | [c] >100 | [d] 11 |

[a] Ratio of weights of specimen before and after ~24 hours in solvent at 25° C.
[b] Percent change in elongation with 100 p.s.i. load on specimen based on original cross section.
[c] In less than 20 minutes.
[d] Between 60′ and 220′.

The data show the great improvement in strength, the improved resistance to hydrocarbon solvents, especially to toluene, and the very slow creep in the vulcanized specimens compared to those of the unvulcanized control compositions.

EXAMPLES IV AND V

Using techniques similar to Examples II and III, compositions were made from 100 parts of the same selectively hydrogenated block copolymer used in Examples II and III but using 35 parts of an unsaturated polystyrene-polybutadiene two-block copolymer having average block molecular weights of 15,800 and 5,400 and having a higher 1,2 microstructure (72% compared to ~9%) in the butadiene polymer block. After vulcanization with sulfur and accelerator, the test composition had the properties shown in Table II. The control composition had 5 phr. benzpinacol added as an inert filler.

TABLE II.—TEST DATA—SULFUR CURED COMPOSITION

| | No vulcanizing agent | Sulfur-accelerator vulcanization |
|---|---|---|
| Example | II | III |
| Tensile strength, 23° C., p.s.i. | 930 | 2,100 |
| 300% modulus, 23° C., p.s.i. | 750 | 1,700 |
| Elongation at break, 23° C., p.s.i. | 380 | 380 |
| Set, 23° C., percent | 20 | 50 |
| Solvent swell ratio: [a] | | |
| Toluene | Soluble | 14.2 |
| Isooctane | 14.2 | 7.1 |
| Creep, percent, 70° C. | [b] >100 | [c] 5 |

[a] Ratio of weights of specimen before and after ~24 hours in solvent at 25° C.
[b] In less than 20 minutes.
[c] Between 60′ and 220′.

The data in Table II show that the presence of considerably more 1,2 microstructure in the unsaturated block copolymer component is not detrimental, since the same improved results were obtained as in the compositions containing unsaturated block copolymer of low 1,2 microstructure.

EXAMPLES VI AND VII

Using techniques similar to Examples II and III, the mixture of 100 phr. of selectively hydrogenated block copolymer and 35 phr. of unsaturated two-block copolymer of Examples II and III was vulcanized with peroxide. For this purpose, 3 phr. of dicumyl peroxide was incorporated in the blend of the two polymers. The compound was vulcanized in a rubber mold for 30 minutes at 160° C. Again, a control composition was made without peroxide with benzpinocol added. The properties of the peroxide cured specimens are in Table III.

TABLE III.—PEROXIDE CURED COMPOSITIONS

| | No vulcanizing agent | Peroxide vulcanization |
|---|---|---|
| Example | VI | VII |
| Tensile strength, 23° C., p.s.i. | 840 | 3,000 |
| 300% modulus, 23° C., p.s.i. | 670 | |
| Elongation, 23° C., percent | 390 | 310 |
| Set, 23° C., percent | 40 | 80 |
| Solvent swell ratio: [a] | | |
| Toluene | Soluble | 7.7 |
| Isooctane | 14.5 | 3.1 |
| Creep, 70° C., percent | [b] >100 | [c] 3 |

[a] Ratio of weights of specimen before and after ~24 hours in solvent at 25° C.
[b] In less than 20 minutes.
[c] Between 60′ and 220′.

The data show that peroxide vulcanization produced the same improved results as sulfur-accelerator vulcanization.

I claim as my invention:

1. A vulcanizable composition comprising
   (1) 95% to about 50% of a block copolymer having, prior to selective hydrogenation, at least one mono alpha alkenyl arene polymer block and at least one conjugated diene polymer block, said copolymer being selectively hydrogenated to saturate at least 80% of the olefinic double bonds and 0% to about 25% of the aromatic double bonds,
   (2) 5% to about 50% of an unsaturated block copolymer having at least one mono alpha alkenyl arene polymer block and at least one conjugated diene polymer block, both of said block copolymers consisting only of carbon and hydrogen atoms and a vulcanizing amount of a vulcanizing agent.

2. A composition according to claim 1 in which the selectively hydrogenated block copolymer, prior to hydrogenation, has the general formula A—B—(B—A)$_{1-5}$, and the unsaturated block copolymer has the general formula A—B—(B—A)$_{0-2}$, wherein each A is a mono alpha alkenyl arene polymer block and each B is a conjugated diene polymer block.

3. A composition according to claim 2 wherein the block copolymers are made from conjugated dienes selected from the group consisting of butadiene, isoprene and alkyl butadienes.

4. A composition according to claim 2 wherein the block copolymers are made from mono alpha alkenyl arenes selected from the group consisting of styrene, ring substituted styrenes, alpha alkyl styrenes, and vinyl naphthalenes.

5. A composition according to claim 1 wherein the selectively hydrogenated block copolymer, prior to hydrogenation, is polystyrene-polybutadiene-polystyrene and the unsaturated block copolymer is polystyrene-butadiene.

6. A composition according to claim 1 wherein the selectively hydrogenated block copolymer, prior to hydrogenation, is polystyrene-polyisoprene-polystyrene and the unsaturated block copolymer is polystyrene-polyisoprene.

7. A composition according to claim 1 wherein the selectively hydrogenated block copolymer, prior to hydrogenation, is polyalpha methyl styrene-polybutadiene-polyalpha methyl styrene and the unsaturated block copolymer is polyalpha methyl styrene-polybutadiene.

8. The vulcanized product made from the composition according to claim 1.

9. The vulcanized product made from the composition according to claim 2.

References Cited
UNITED STATES PATENTS

| | | | |
|---|---|---|---|
| 3,607,977 | 9/1971 | Taylor et al. | 260—876 |
| 3,595,942 | 7/1971 | Wald et al. | 260—880 |
| 3,686,365 | 8/1972 | Sequeira | 260—876 B |
| 3,646,161 | 2/1972 | Marwede | 260—876 B |

MURRAY TILLMAN, Primary Examiner
R. B. TURER, Assistant Examiner

U.S. Cl. X.R.

204—159.18, 159.2; 260—79.5 B, 79.5 C, 880, 886, 887, 894